(12) United States Patent
Ylamurto

(10) Patent No.: US 9,037,095 B2
(45) Date of Patent: May 19, 2015

(54) RADIO FREQUENCY TRACKING FILTER

(75) Inventor: Tommi Ylamurto, Los Gatos, CA (US)

(73) Assignee: Nokia Technologies Oy, Espoo (FI)

( * ) Notice: Subject to any disclaimer, the term of this patent is extended or adjusted under 35 U.S.C. 154(b) by 161 days.

(21) Appl. No.: 13/477,512

(22) Filed: May 22, 2012

(65) Prior Publication Data

US 2013/0316659 A1    Nov. 28, 2013

(51) Int. Cl.
*H04B 1/00* (2006.01)

(52) U.S. Cl.
CPC .................................... *H04B 1/0057* (2013.01)

(58) Field of Classification Search
CPC ... H03H 19/008; H03H 19/002; H03H 11/10; H04B 1/109
See application file for complete search history.

(56) References Cited

U.S. PATENT DOCUMENTS

| | | | |
|---|---|---|---|
| 5,434,541 A | 7/1995 | Knoedl | |
| 6,453,157 B1 | 9/2002 | Roberts | 455/337 |
| 7,187,230 B2 | 3/2007 | Vilhonen | 327/552 |
| 7,541,863 B2 | 6/2009 | Vilhonen | 327/552 |
| 2009/0011732 A1* | 1/2009 | Bayruns | 455/150.1 |
| 2009/0156152 A1 | 6/2009 | Sahota et al. | 455/296 |

FOREIGN PATENT DOCUMENTS

WO    WO 2008114070 A1 *    9/2008

OTHER PUBLICATIONS

Youssef, et al., "Active Feedback Receiver with Integrated Tunable RF Channel Selectively, Distortion Cancelling, 48dB Stopband Rejection and >+Bm Wideband IIP3, Occupying 0.06mm2 in 65nm CMOS", 2012 IEEE International Solid-State Circuits Conference Digest of Technical Papers (ISSCC) Feb. 19-23, 2012, (pp. 166-168).*

Youssef, et al., "Active Feedback Receiver with Integrated Tunable RF Channel Selectively, Distortion Cancelling, 48dB Stopband Rejection and >+Bm Wideband IIP3, Occupying <0.06mm2 in 65nm CMOS", 2012 IEEE International Solid-State Circuits Conference Digest of Technical Papers (ISSCC) Feb. 19-23, 2012, (pp. 166-168).

"Tunable High-Q N-Path Band-Pass Filters: Modeling and Verification", Amir Ghaffari, et al., IEEE Journal of Solid-State Circuits, vol. 46, No. 5, May 2011, pp. 998-1010.

* cited by examiner

*Primary Examiner* — Wesley Kim
*Assistant Examiner* — Dong-Chang Shiue
(74) *Attorney, Agent, or Firm* — Harrington & Smith

(57) ABSTRACT

The specification and drawings present a new apparatus and method for an RF tracking filter which may be used in RF transceivers. Instead of having band pass filter and switches in the signal path exemplary embodiments of the invention describe keeping the signal path intact for wanted frequency components and drawing selectively signal energy (e.g., corresponding to unwanted frequency components) from the signal path. This may be done with a shunt passive switch comprising multiple switches for generating commutated signals of the radio frequency signal. Behind the switches there may be a plurality of active feedback loops, each drawing a frequency dependent current for one of the one or more commutated signals and feeding the drawn current back to the passive input switch to cancel only the unwanted frequency components of the radio frequency signal.

18 Claims, 6 Drawing Sheets

RADIO FREQUENCY TRACKING FILTER

TECHNICAL FIELD

The exemplary and non-limiting embodiments of this invention relate generally to wireless communications, and more specifically to using RF tracking filter, e.g., in RF receivers/transceivers.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

BAW bulk acoustic wave
BB baseband
BiCMOS bipolar CMOS
CDMA code divisional multiple access
CMOS complimentary metal-oxide semiconductor
F frequency
I/O inputs/outputs
IC integrated circuit
LNA low noise amplifier
LO local oscillator (signal)
PA power amplifier
PWB printed wiring board
RF radio frequency
RFIC radio frequency integrated circuits
S21 s-parameter transfer function from input port to output port
SAW surface acoustic wave
TIF transfer impedance filter
WCDMA wideband CDMA
Z impedance Signals that enter or leave active or passive components of a transceiver may be filtered in order to remove unwanted (e.g., interfering) signal components. More bands the transceiver covers, more band selection filters are needed.

The RF receivers may tolerate high blocking signals while maintaining their own performance. This may require filtering for RF-signals prior to a LNA (low noise amplifier) and in many systems also after the LNA. This may especially be true in code division multiple access systems (e.g., CDMA2000 and WCDMA) where a transmitter may send its high-level signal while a receiver receives a very low-level signal.

SUMMARY

According to a first aspect of the invention, a method, comprising: receiving by a radio frequency tracking filter a radio frequency signal from a signal path; and filtering by the radio frequency tracking filter the radio frequency signal leaving a wanted frequency component of the radio frequency signal in an original path and removing unwanted frequency components of the radio frequency signal from the original signal path using a passive input switch comprising multiple switches and generating multiple commutated signals of the radio frequency signal, and a plurality of active feedback loops having at least one active feedback loop for every commutated signal, each active feedback loop feeding frequency selected current to the passive input switch to cancel only the unwanted frequency components of the radio frequency signal.

According to a second aspect of the invention, an apparatus, comprising:
a passive input switch, comprising multiple switches, configured to receive a radio frequency signal from a signal path and to generate multiple commutated signals of the radio frequency signal; and a plurality of active feedback loops having at least one active feedback loop for every commutated signal, wherein each active feedback loop is configured to feed frequency selected current to the passive input switch to cancel only unwanted frequency components of the radio frequency signal, wherein the apparatus is configured to filter the radio frequency signal leaving a wanted frequency component of the radio frequency signal in an original signal path and removing the unwanted frequency components of the radio frequency signal from the original signal path.

According to a third aspect of the invention, an apparatus, comprising:
means for receiving by a radio frequency tracking filter a radio frequency signal from a signal path; and means for filtering by the radio frequency tracking filter the radio frequency signal leaving a wanted frequency component of the radio frequency signal in an original path and removing unwanted frequency components of the radio frequency signal from the original signal path using a passive input switch comprising multiple switches and generating multiple commutated signals of the radio frequency signal, and a plurality of active feedback loops having at least one active feedback loop for every commutated signal, each active feedback loop feeding frequency selected current to the passive input switch to cancel only the unwanted frequency components of the radio frequency signal.

BRIEF DESCRIPTION OF THE DRAWINGS

For a better understanding of the nature and objects of the present invention, reference is made to the following detailed description taken in conjunction with the following drawings, in which.

DETAILED DESCRIPTION

Figure 1:
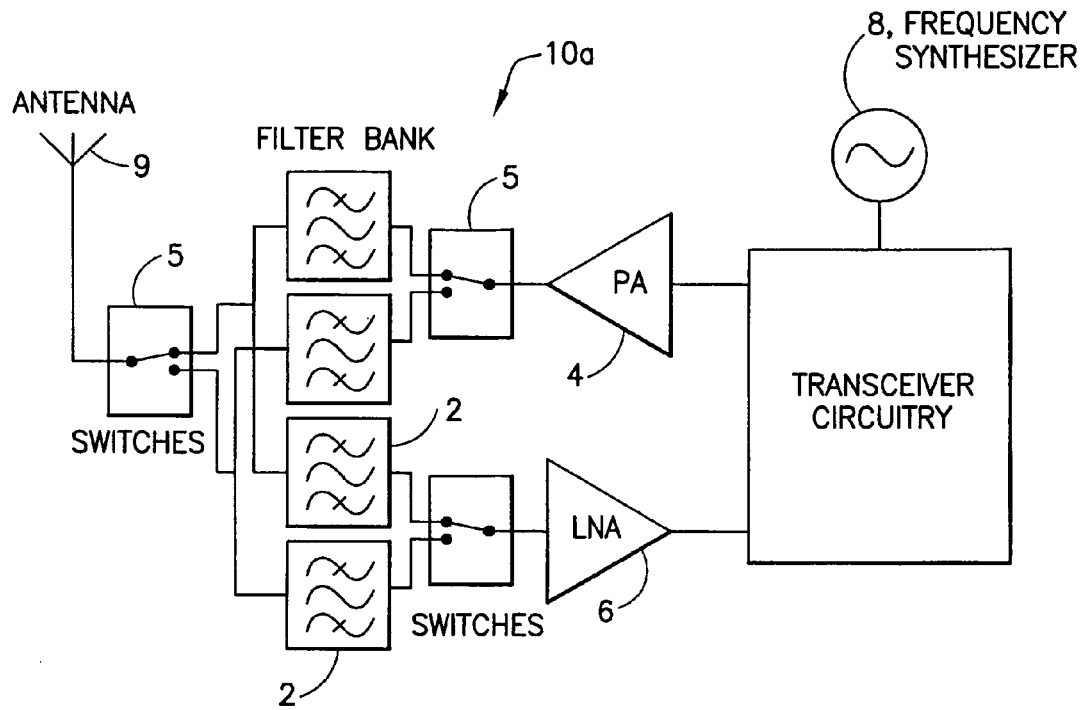
FIG. 1 is an example of a block diagram of a multiband conventional RF transceiver.

A new method and apparatus are presented for an RF tracking filter which can be used in RF transceivers. Instead of having band pass filter and band selection switches in the signal path, exemplary embodiments of the invention describe keeping the signal path intact for wanted frequency components and drawing selectively signal energy (e.g., corresponding to unwanted frequency components) from the signal path. This may be done with a shunt passive switch comprising multiple switches for generating one or more commutated signals of the radio frequency signal. Behind the switches there may be a plurality of active feedback loops, each drawing a frequency dependent current for one of the one or more commutated signals and feeding the drawn current back to the passive input switch to cancel only the unwanted frequency components of the radio frequency signal. In other words, active circuits may provide high impedance level for the commutated wanted signal and its harmonics while providing low impedance for the unwanted signal frequencies and its harmonics.

By way of introduction, filter bank and switch matrix is a predominant approach to implement multi band reception and transmission. At the present time, filtering may be done mainly with SAW (surface acoustic wave) or BAW (bulk acoustic wave) filters or resonators. These components may be expensive, may be impossible to integrate with a standard CMOS or BiCMOS process and may also require large areas of PWBs (printed wiring boards). Such filters may also decrease the possibility for modularity and also increase the number of I/O's (inputs/outputs) in RFIC's (radio frequency integrated circuits) thus increasing their complexity.

Multiband transmitters and receivers may use several band selection filters that may be costly and bulky external components, requiring a lot of space and degrading the signal quality. Transfer impedance filters tried to solve this issue (see U.S. Pat. Nos. 7,187,230 and 7,541,863). However both of these approaches may suffer from low stop band rejection and from image leakage that may distort the wanted signal.

By way of further introduction, conventional receiver may have one chain and unwanted signals may be removed by filters/switches that are in the signal path. These filters may not only degrade (e.g., attenuate) the signal quality of the wanted signal but may be bulky and costly. There are over 40 frequency bands in the latest ETSI standards. It might be challenging with current technologies to implement that many filters in the form factor and price point of a cell phone. Trans-impedance filter (TIF) based receiver may have several parallel receiver chains. The wanted signal may still be received by the conventional receiver chain (minus the filters or with simpler filters). The unwanted signals may be received by additional receiver chains. The additional receivers may use passive down-conversion so by definition any energy that is received may originate from the source. If these additional receivers can be made frequency selective then they may receive (or remove) any unwanted signal frequencies from the input. Since one TIF is not necessarily enough to meet the filtering requirements these inputs may be along multiple points in the conventional receiver chain circuitry. Since the TIF principle is to provide low impedance for the unwanted signals these points are high impedance nodes of the receiver circuitry. In conventional TIF, it may be that any RF energy (at frequency $f_{lo}+f$) dissipated in the baseband may create RF signal $f_{lo}-f$. This is called image leakage. Thus, if any of the wanted signal energy goes to the TIF receiver chain it may distort the wanted RF signal.

Furthermore, FIG. 1 presents an example of a block diagram of a multiband transceiver system 10a comprising conventional components: filter bank 2, band selection switches 5, RF antenna 9, amplifiers LNA 6 and PA 4 (for receiving and transmitting RF signals, respectively), and a frequency synthesizer 8 (e.g., a local oscillator).

Figure 2:
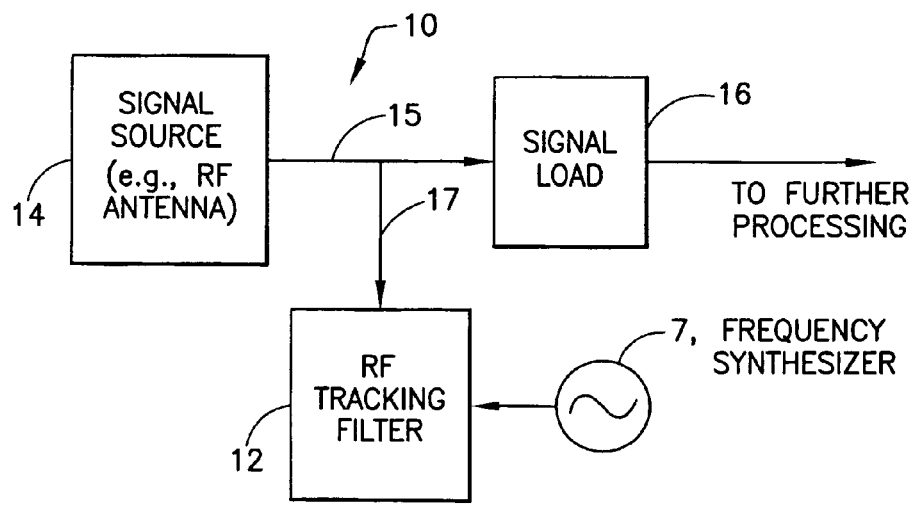
FIG. 2 is a simplified block diagram illustrating using an RF tracking filter in RF transceiver according to an exemplary embodiment of the invention.

FIG. 2 shows a simple block diagram according to an exemplary embodiment of this invention. Instead of relying on costly and bulky external band selection filters and switches in the signal path, as shown in FIG. 1, this technology introduces second signal path and circuitry for the unwanted signals. This new circuit may leave the wanted frequency signal intact on an original signal path 15. The unwanted frequency signals, on the other hand, may see low impedance on a signal path 17. These signals travel to the low impedance circuit 12 and leave the original signal path 15 as further explained below.

Figure 3:
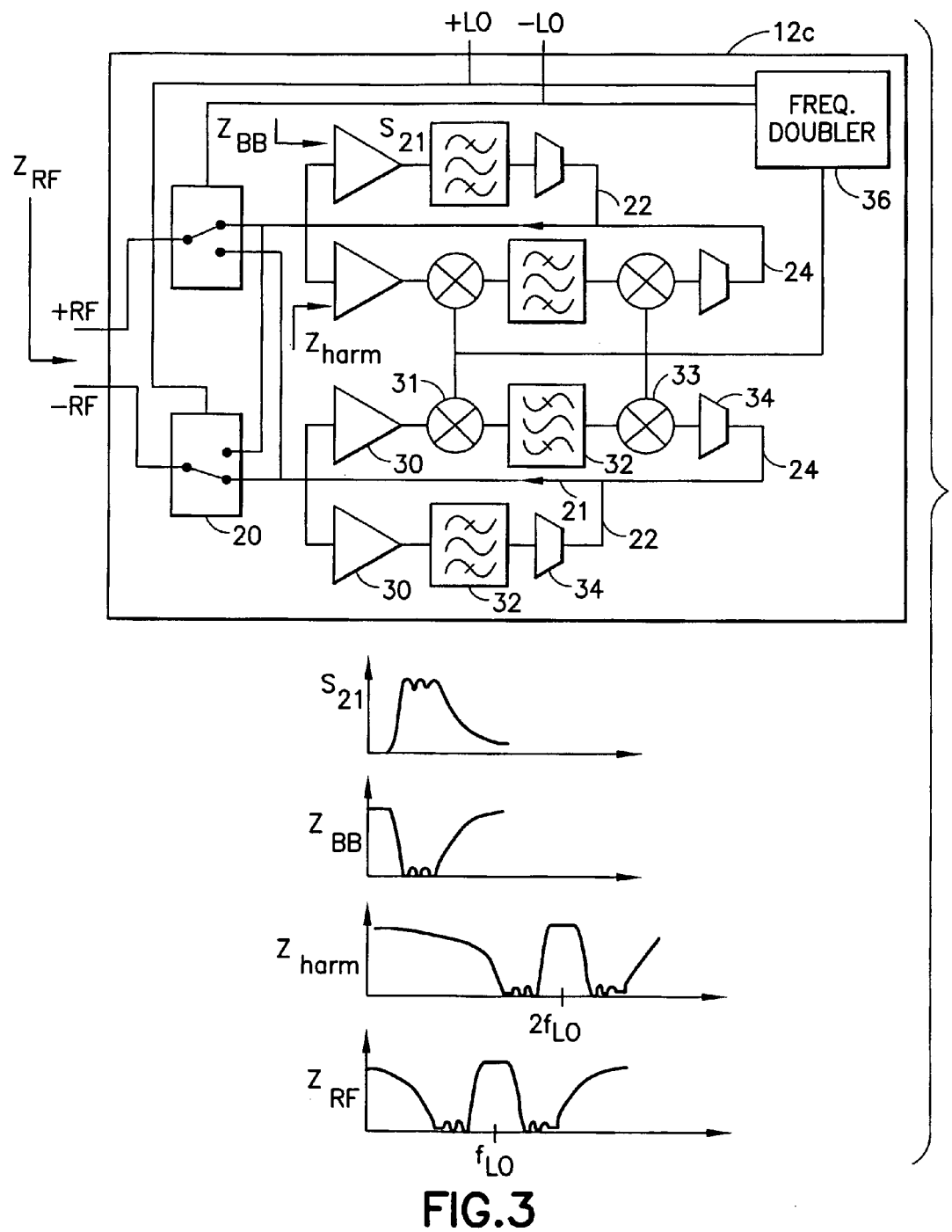
FIG. 3 is a block circuitry diagram of a differential RF tracking filter according to an exemplary embodiment of the invention.

FIG. 3 shows an example of a circuit of the RF tracking filter 12 of FIG. 2 as a differential RF tracking filter 12c which may leave the original signal path 15 intact for the wanted frequency signal and may draw selectively frequency dependent signal energy corresponding to the unwanted frequency signals from the signal path 15. This may be done with shunt passive switch 20 comprising multiple switches that commutate, e.g., at the rate of the wanted signal center frequency, generating a commutated signal comprising multiple harmonics as explained below. Behind the switches may be active circuits, i.e., a plurality of active feedback loops that may provide high impedance level for the commutated wanted signal and its harmonics while providing low impedance for the unwanted signal frequencies and its harmonics. The active impedance feedback circuit/loop 22 for the signal (baseband signal) may comprise of a buffer amplifier 30, a baseband filter 32, a transimpedance/current amplifier 34 and a feedback line 21 back to the circuit input (i.e., to the passive switch 20). The active impedance feedback circuit/loop 24 for the harmonic components (e.g., $1^{st}$, $2^{nd}$, $3^{rd}$, etc. commutating clock harmonic) of the commutated signal may comprise of the buffer amplifier 30, a downconversion mixer 31 working at the one of the commutating clock harmonic frequency (in the example of FIG. 3, it is double frequency of the local oscillator), a baseband filter 32, another mixer 33 (for upconversion), the transimpedance/current amplifier 34 and the feedback line back to the circuit input (i.e., to the passive switch 20). Prior art tracking filters may use simple capacitor as an impedance circuit, e.g., capacitor 42 in FIG. 5a of the U.S. Pat. Nos. 7,187,230 and 7,541,863. This capacitor may provide neither good stop band attenuation (due to the passive first order filter) nor image rejection (due to the missing circuitry for the harmonics) nor adaptive bandwidth. The exemplary embodiments described herein may implement any arbitrary frequency dependent impedance while the capacitance may have a poor frequency response.

Below the circuit of the differential RF tracking filter 12c in FIG. 3, there are frequency dependent impedance diagrams at the points as indicated in the circuit of the RF tracking filter 12c. These diagrams are provided for better understanding the performance of the RF tracking filter 12c.

Moreover, since the input signal is at RF frequency, conversion should be performed. This frequency conversion may be passive since the current going into the low impedance may originate from the RF source (in active frequency converters the power may originate from the battery). A passive frequency converter may be implemented using switches with a LO signal (switching clock signal) turning them on and off. The passive switch 20 in FIG. 3 may sample the signal from the RF input, for example using 50% duty cycle and on-off type of switching by a local oscillator signal (commutating clock signal). Switch 20 may be an extremely nonlinear component. For example, it may create multiplication between $V_{in}*Sin(2*\pi*F_{in})$ and $Sin(2*\pi*F_{lo})+\frac{1}{3}*\sin$ $(2*\pi*3*F_{lo})+\frac{1}{5}*\sin(2*\pi*5*F_{lo})$, where Flo is a local oscillator frequency, or commutating frequency, Vin is an input RF voltage and Fin is an input RF frequency. This switching may allow to provide a baseband signal component (that sees frequency dependent impedance $Z_{BB}$ shown in FIG. 3) and switching clock harmonic signals component (that sees frequency dependent impedance $Z_{harm}$ shown in FIG. 3). In general the harmonic signals may be Nth order harmonics, N being a finite integer of one or more. For example, multiplication of $Vin*\sin(2*\pi*F_{in})$ and $\sin(2*\pi*F_{lo})$ may provide a baseband signal and a second harmonic signal.

In other words, one frequency component of the multiple commutated signals may be a baseband signal of the radio frequency signal generated using a local oscillator frequency signal. At least one frequency component of the multiple commutated signals may be a baseband signal of the radio frequency signal generated using a local oscillator frequency signal.

Figure 5A:
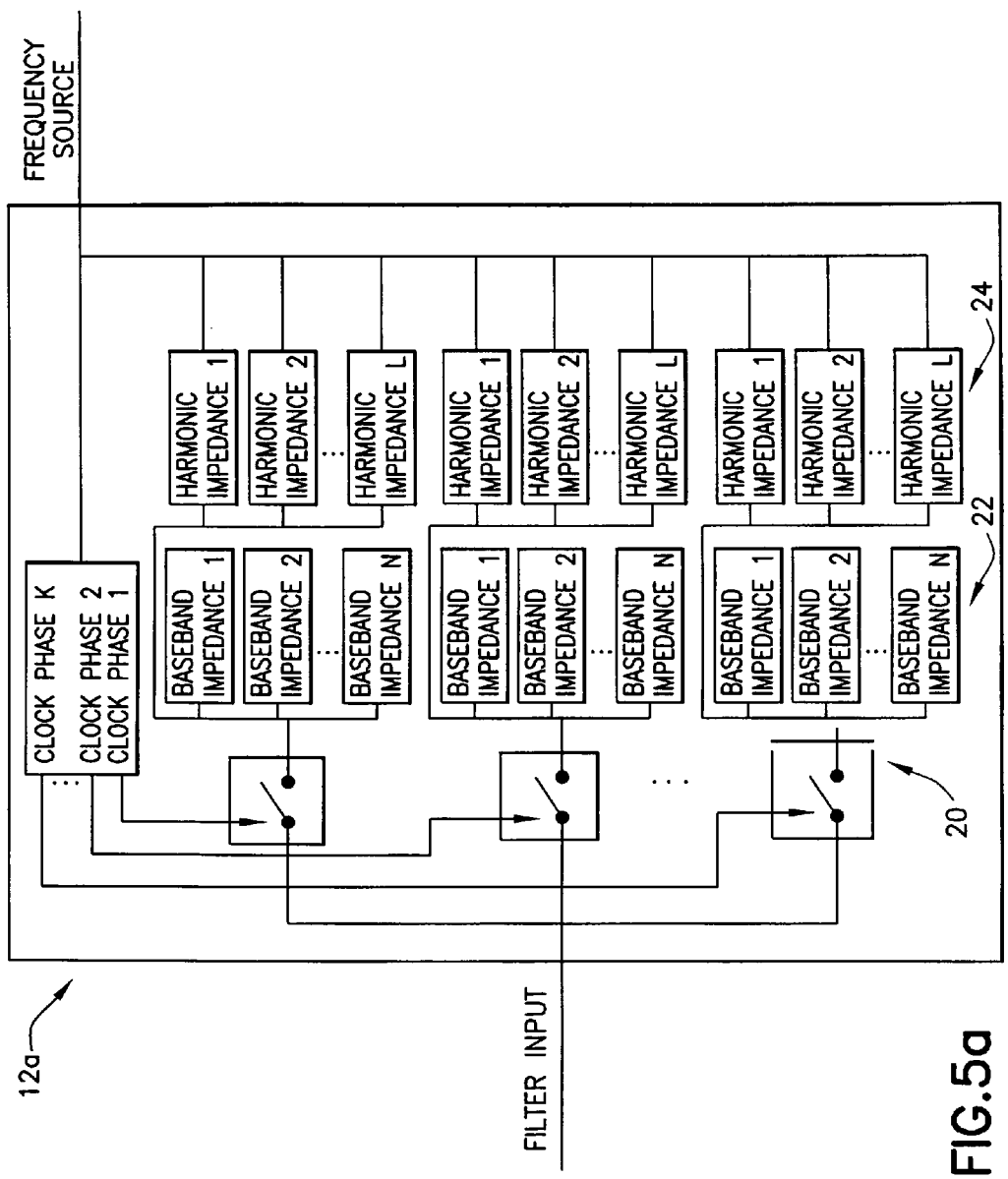
FIGS. 5a-5b are implementation diagrams of a RF tracking filter with one input (FIG. 5a) and with a differential input having two inputs (FIG. 5b)
Figure 5B:
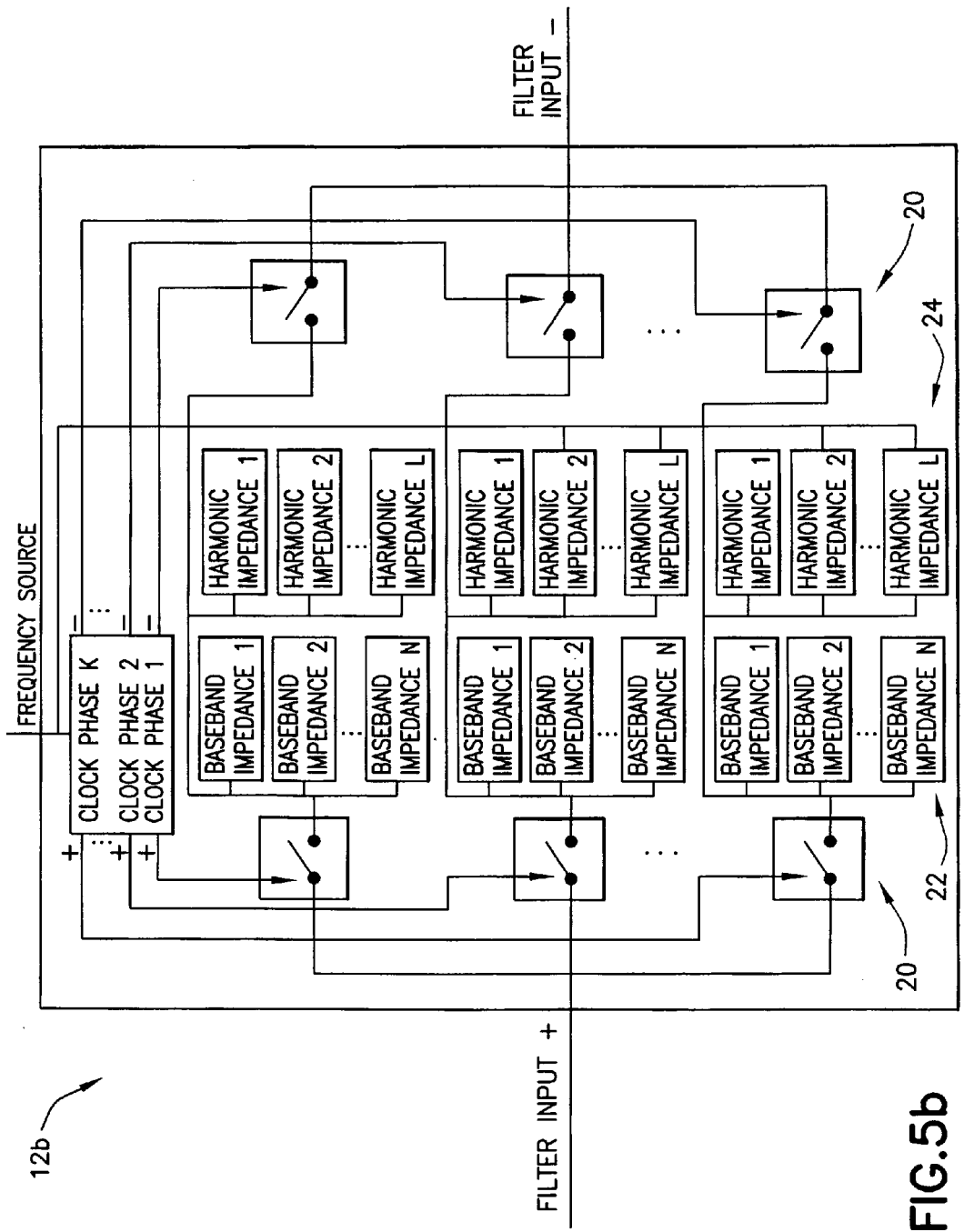

Different implementations of the RF filter 12 is further demonstrated as RF filter 12a in FIG. 5a with one input and as RF filter 12b in FIG. 5b with two inputs (differential input as in FIG. 3). K clock/time phases are used, where K is an integer of two or more. For the circuit of FIG. 3 K equals 2 which implies having a total of 4 switches in the passive switch 20. It may be advantageous to sample the RF signal with more than two phases as demonstrated in FIGS. 5a and 5b. For the circuit of FIG. 5a the number of switches equals K in the passive switch 20 and for the circuit of FIG. 5b the number of switches equals 2K in the passive switch 20. In these cases (shown in FIGS. 5a and 5b) each of the additional phases will need their own feedback loops.

It is further noted that the passive switch 20 comprising multiple switches may be a device as shown in FIG. 5a creating each commutating signal by intermittently connecting the RF signal path to the switch output according to the local (oscillator) clock signal. Alternatively, the switch 20 comprising multiple switches may be a device as shown in FIGS. 5b and 3 creating each commutating signal by alternatingly connecting the RF signal path to the switch output according to the local (oscillator) clock signal. In other words, in the latter case of the differential input signal shown in FIGS. 5b and 3, each commutated signal is created using two switches.

Moreover, each switch of the passive switch 20 may have one input and multiple outputs, e.g., to multiple feedback loops in each of the feedback loops 22 and/or 24. Therefore in general any one commutated signal of the one or more commutated signals may be processed by one or more of the active feedback loops.

Further, each commutated signal comprise baseband component and multiple harmonic frequency components as explained herein (e.g., the commutated signal may be a result of multiplication of $Vin*\sin(2*\pi*F_{in})$ and $\sin(2*\pi*F_{lo})+\frac{1}{3}*\sin(2*\pi*3*F_{lo})+\frac{1}{5}*\sin(2*\pi*5*F_{lo})$, as explained herein). Each feedback loop out of 22 or 24 active feedback loops "selects" the appropriate frequency component for processing based at least on the passband of the filter 32 (and frequency mixers 31 and 33 for harmonic feedback loops 24) shown in FIG. 3.

Also, in order to keep the feedback loops stable more than one parallel loop may be needed to get the desired frequency response. For example, in FIGS. 5a and 5b for each phase (out of K) there are N baseband active impedance feedback loops 22 (loops 22 are also shown in FIG. 3). Similarly, for each phase (out of K) there are L baseband active impedance feedback loops 24 (loops 24 are also shown in FIG. 3). The baseband filters 32 in N active feedback loops 22 and in L active feedback loops 24 may have the same, different or partially different passbands in all or in selected feedback loops.

It is noted that the active feedback loops 22 may be used alone, as well as the active feedback loops 24 may be used alone. Alternatively, which is a more likely scenario, the baseband and harmonic loops 22 and 24 may be both used as shown in FIGS. 3, 5a and 5b to provide more accurate results.

The further exemplary embodiments may provide frequency selective impedance behind the passive switch 20 (comprising multiple switches) as shown in FIG. 3. The idea is to provide frequency selective impedance behind the switch 20 using a signal path parallel to the original signal path (the signal path 15 as shown in FIG. 2). The second signal path may have lower impedance for frequency components that are not wanted. The low impedance may make a difference when the signals are currents. The current flows to the lowest impedance. If the impedance is frequency dependent then we may send different frequencies to different destinations in the system using the frequency dependent impedance at baseband and at harmonic frequencies, as demonstrated in FIG. 3.

The signal path parallel to the original signal path 15 may be implemented using the active impedance feedback loops 22 (for baseband impedance) and 24 (for harmonic impedance). It is noted that in order to keep the feedback loop stable, multiple parallel feedback paths may be needed as shown in FIGS. 5a and 5b. A number of feedback loops may be minimum two for the baseband impedance or for any harmonic impedance. The reason is that each of the switches is conductive only half of the time (or less). That means that the other half of the time we have to direct the unwanted signal somewhere else. FIG. 3 shows four feedback loops.

Furthermore, each of the loops 22 and 24 shown in FIG. 3 may have a high impedance buffer voltage amplifier 30 which makes sure that no current is drawn from the RF input thus providing high impedance. In other words, the high impedance buffer amplifier 30 "measures" the voltage from the passive switch 20.

This measured voltage may be filtered (in a corresponding feedback loop) with a desired frequency response using the filter 32. In other words, the amplified baseband signal may be filtered to pass only frequencies corresponding to the unwanted frequency components using a filter with a passband corresponding only to the unwanted frequency components.

The filtered signal may be fed to a current (transimpedance) amplifier 34 with a high impedance output. The output current from this amplifier 34 may be fed through the feedback line 21 back to the input of this circuitry. This whole structure implements impedance that "copies" the frequency response of the used filter. The filter 32 may be band stop or band pass or even high/low pass depending where the unwanted signals are located compared to the sampling clock frequency. It is noted that the performance of the feedback loops 24 may be similar to the performance of the feedback loops 22 except that in the feedback loop 24, the buffered signal (after amplifier 30) is downconverted by a double frequency of the local oscillator (generated by the frequency doubler 36) using a frequency mixer 31 so that the harmonics of the switching clock signal sees the frequency dependent impedance. After filtering with the filter 32, the filtered signal may be upconverted back by the double frequency of the local oscillator using a frequency mixer 33.

It is further noted that in some systems the frequency of the local oscillator is already doubled, then instead of frequency doubler 36, we need to use a frequency divider for providing appropriate local oscillator signals to the corresponding components of the RF filter 12c in FIG. 3.

Thus in FIG. 3 the voltage signal after the passive switch 20 may contain two frequency components: downconverted version of the RF signal (which is going through the loop 22) and a second harmonic signal (which is going through the loop 24). For the wanted signal we may not want any current to be drawn at either of those components. On the other hand, for the unwanted signals we may want the current to be drawn at both of those components. The feedback loops 22 and 24 (two identical loops for each of the 22 and 24 loops) may make sure that these conditions apply. The feedback loop may provide negative feedback through the bandpass filter 32 thus removing the signal unwanted components inside the passband. FIG. 3 illustrates the frequency dependent impedance at different parts of the circuit. Effectively this may translate the sharp baseband filter characteristics to the radio frequencies. It is noted that the filter 32 may have the same or different passbands in the loops 22 and 24.

Figure 4:
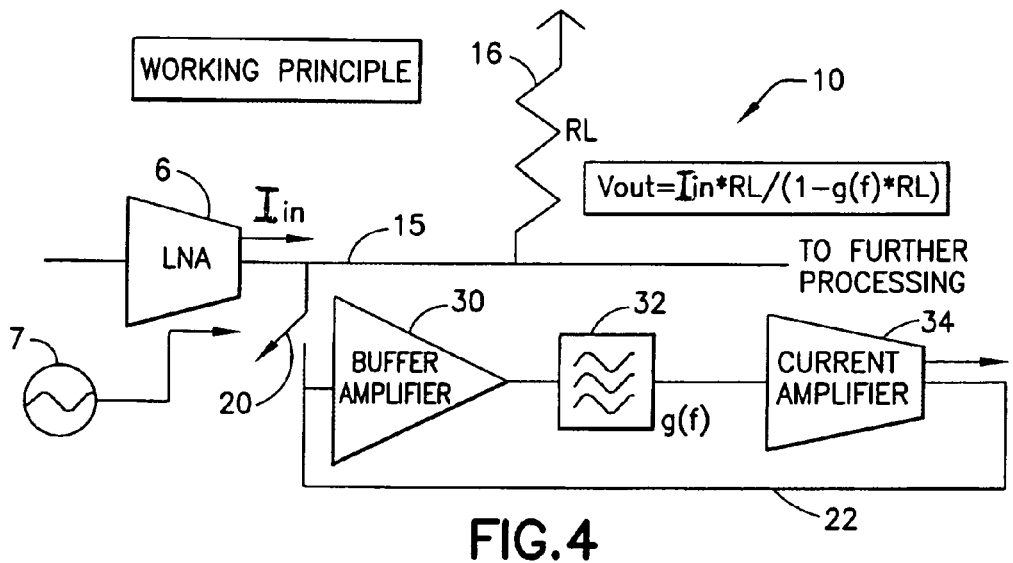
FIG. 4 is a simplified circuitry diagram demonstrating a principle of operation of the RF tracking filter shown in FIG. 3 for cancelling unwanted frequency components and leaving wanted frequency components intact, according an exemplary embodiment.

FIG. 4 further explains the principle of operation of the RF tracking filter 12 of FIG. 3 in regard to cancelling of the unwanted frequency components and keeping wanted frequency component intact enough to meet the signal quality requirements of a particular standard that is used. FIG. 4 shows amplifier 6 with current output $I_{in}$ in the signal path 15 (originated from the high impedance node of the current amplifier 6) and a load RL 16, a switch 20 (switched by a signal from the local oscillator 7). Also FIG. 4 shows one feedback loop 22 comprising the buffer voltage amplifier 30, the filter 32 and the current amplifier 34 and having a total voltage gain g.

The input to the system is current and the output of the system is $V_{out}$. The feedback senses voltage $V_{out}$ and amplifies it by the gain g before changing it to a current. Then $V_{out}= (I_{in}+V_{out}*g)*RL$. Solving for $V_{out}$, it follows that $$V_{out}=I_{in}*RL/(1-g*RL) \quad (1)$$

If g is large (unwanted frequencies case) then $V_{out}=0$, meaning that unwanted frequency components may be eliminated from the signal path 15. On the other hand if g is small (wanted frequencies case) then $V_{out}=I_{in}*RL$, meaning that wanted frequency components may be passed intact.

Figure 6A:
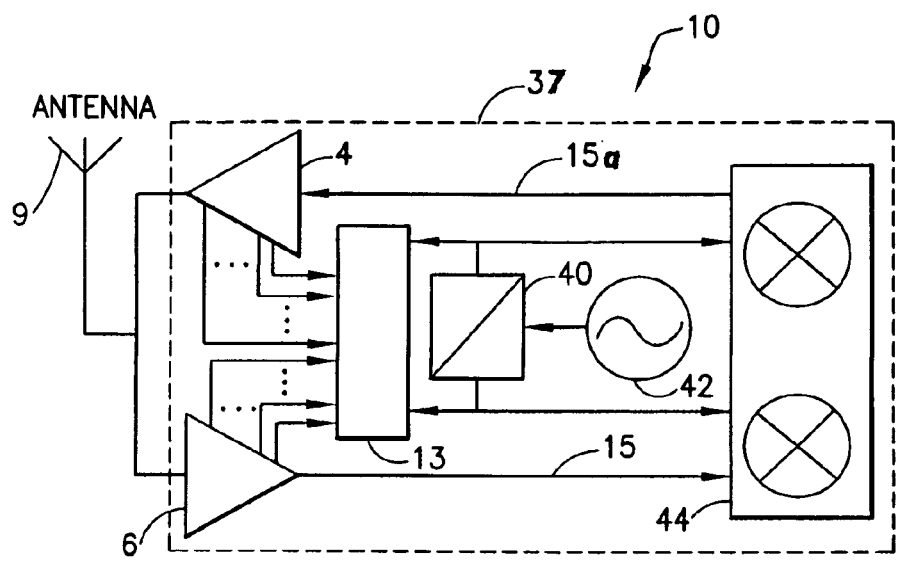
FIGS. 6a-6b are simplified block diagram of multiband RF transceivers with multiphase processing (e.g., for inphase and quadrature components) using an RF tracking filter in FIG. 6a and conventional external filters in FIG. 6b.

FIG. 6a shows an exemplary embodiment for application of the RF tracking filters 13 (in general comprising multiple RF filters 12) in a multiband transceiver 10 according to an exemplary embodiment. PA and LNA 6 may have high impedance nodes to enter the RF tracking filters 13 for eliminating unwanted frequency components. Signal paths 15 and 15a may be for wanted frequency components. The dashed box 37 identifies a part of transceiver circuitry implemented as an integrated circuit (IC).

Moreover, a component 44 with mixers represents a frequency conversion and low frequency parts of the transceiver, a component 42 is frequency source/oscillator and a component 40 is a phase shifter such as 90 degrees splitter for inphase and quadrature components.

It is noted that the RF tracking filter 12 may be used for a received signal (e.g., from antenna 9) or for a signal to be transmitted (by antenna 9) as shown in FIG. 6a.

It is further noted that the multiband transceiver 10 comprising the RF tracking filter 12 may be a part of a user equipment (UE) in a wireless communication system; the UE may be implemented as a mobile phone, a wireless communication device, a camera phone, a portable wireless device, a smart phone, a tablet, and the like.

Figure 6B:
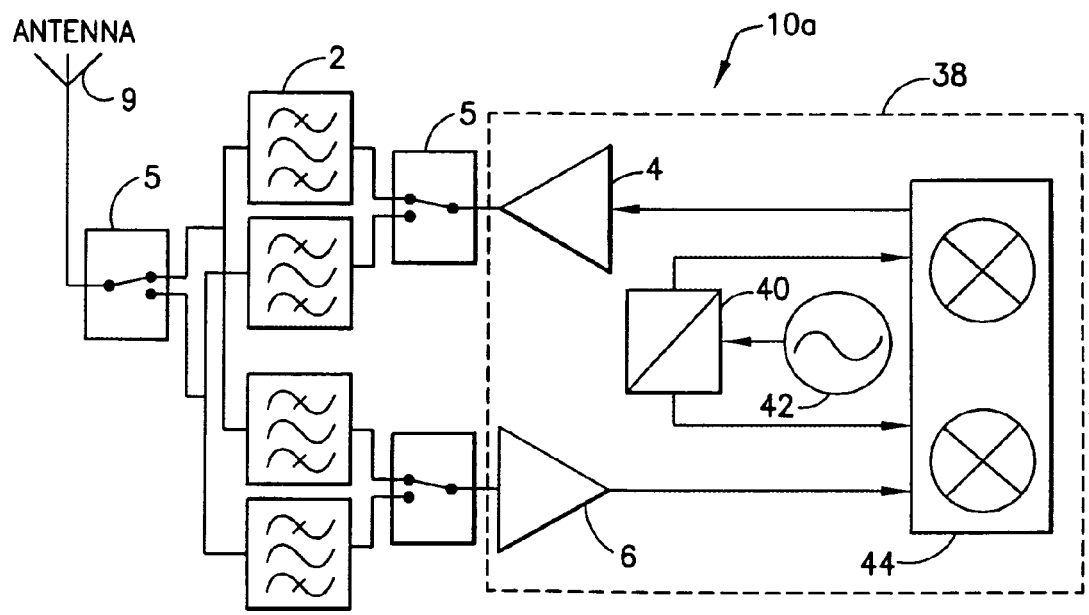

FIG. 6b shows a further example of the multiband RF transceiver 10a (see FIG. 1). The components 2, 5, 40, 42 and 44 may be the same as identified in reference to FIGS. 1 and 6a. The essential difference with FIG. 6a is that in FIG. 6b a dashed box 38 identifying a part of transceiver circuitry implemented in IC may not include the filter bank 2, whereas according to the exemplary embodiment of the invention, the RF tracking filter 12 may be implemented as a part of the IC 37 as shown in FIG. 6a.

Thus the exemplary embodiments described herein demonstrate a number of advantages for using RF tracking filter in transceivers which briefly summarized as follows.

Previous filter bank solutions may be costly, may require a lot of space, may degrade the signal quality and may not be adaptive. By not having the filter in the signal path the loss due to the filtering may be removed. The size and cost of the circuitry may be improved by replacing the external RF filters with a single baseband filter that may be implemented with integrated circuit technology.

Moreover, previous TIF solutions may not have sufficient stop band attenuation due to the simple passive filter structure. They also may distort the wanted signal since they may not provide high impedance for the clock harmonics of the commutated wanted signal. And they may not have any adaptivity. By having active circuitry to implement the frequency dependent impedance may make it possible to have high stop band attenuation as well as sharp transition between the pass and stop bands. Also, this circuitry may be adaptive to the bandwidth of the signal.

Figure 7:
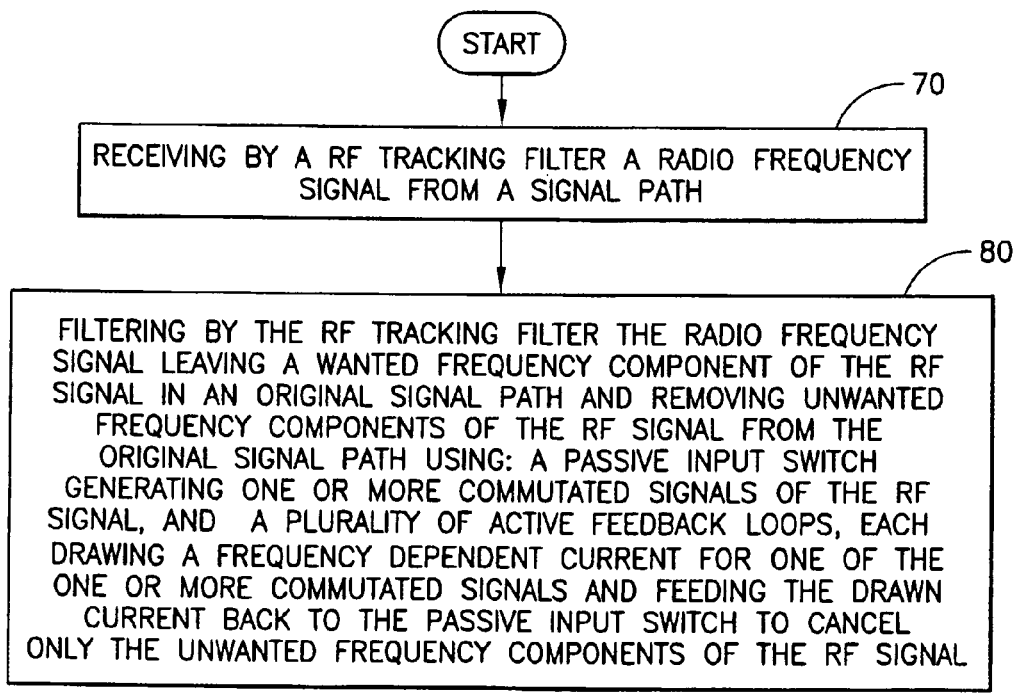
FIG. 7 is a flow chart demonstrating implementation of exemplary embodiments of the invention.

FIG. 7 shows a flow chart demonstrating implementation of the exemplary embodiments of the invention. It is noted that the order of steps shown in FIG. 7 is not absolutely required, so in principle, the various steps may be performed out of the illustrated order. Also certain steps may be skipped, different steps may be added or substituted, or selected steps or groups of steps may be performed in a separate application following the embodiments described herein.

In a method according to this exemplary embodiment, as shown in FIG. 7, in a first step 70, an RF tracking filter receives a radio frequency signal from a signal path (e.g., signal path 17 shown in FIG. 2). In a next step 80, the RF tracking filter may filter the radio frequency signal leaving a wanted frequency component of the RF signal in the high signal path and may remove unwanted frequency components of the RF signal from the original signal path using: a passive input switch generating one or more commutated signals of the RF signal (e.g., baseband signal, harmonic signal), and a plurality of active feedback loops (e.g., each comprising at least a buffer voltage amplifier, a baseband filter and a current amplifier, etc.), each drawing a frequency dependent current for one of the one or more commutated signals and feeding the drawn current back to the passive input switch to cancel only the unwanted frequency components of the RF signal.

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

What is claimed is:

1. A method, comprising:
receiving by a radio frequency tracking filter a radio frequency signal from a signal path; and
filtering by the radio frequency tracking filter the radio frequency signal leaving a wanted frequency component of the radio frequency signal in an original signal path and removing unwanted frequency components of the radio frequency signal from the original signal path using a passive input switch comprising multiple switches and generating multiple commutated signals of the radio frequency signal, and
a plurality of active feedback loops having at least one active feedback loop for every commutated signal, each active feedback loop feeding frequency selected current to a respective output of the passive input switch to cancel only the unwanted frequency components of the commutated signal;
wherein one frequency component of the multiple commutated signals is a baseband signal generated by the passive input switch, and the filtering comprises:
amplifying the baseband signal using a buffer voltage amplifier having high input impedance,
filtering the amplified baseband signal to pass only frequencies corresponding to the unwanted frequency components using a baseband filter with a passband corresponding only to the unwanted frequency components; and
further amplifying the filtered and amplified baseband signal corresponding to the unwanted frequency components by a current amplifier and providing the resultant current signal back to the passive input switch to cancel the unwanted frequency components of the radio frequency signal.

2. The method of claim 1, wherein any commutated signal of the multiple commutated signals is processed by one or more of the active feedback loops.

3. The method of claim 1, wherein one frequency component of the multiple commutated signals is a baseband signal of the radio frequency signal generated using a local oscillator frequency signal.

4. The method of claim 1, wherein at least one frequency component of the multiple commutated signals is located at the Nth order local oscillator harmonic frequency, where N is a finite integer of one or more.

5. The method of claim 1, wherein the radio frequency tracking filter is used for the radio frequency signal received by an antenna or to be transmitted by the antenna.

6. A method, comprising:
receiving by a radio frequency tracking filter a radio frequency signal from a signal path; and
filtering by the radio frequency tracking filter the radio frequency signal leaving a wanted frequency component of the radio frequency signal in an original signal path and removing unwanted frequency components of the radio frequency signal from the original signal path using a passive input switch comprising multiple switches and generating multiple commutated signals of the radio frequency signal, and
a plurality of active feedback loops having at least one active feedback loop for every commutated signal, each active feedback loop feeding frequency selected current to a respective output of the passive input switch to cancel only the unwanted frequency components of the commutated signal,
wherein one frequency component of the multiple commutated signals is a harmonic signal generated by the passive input switch, and the filtering comprises:
amplifying the harmonic signal using a buffer voltage amplifier having high input impedance;
downconverting the amplified harmonic signal by a corresponding harmonic of a local oscillator frequency signal;
filtering the downconverted and amplified baseband signal to pass only frequencies corresponding to the unwanted frequency components using a baseband filter with a passband corresponding only to the unwanted frequency components;
upconverting the resultant filtered signal by a corresponding harmonic of a local oscillator frequency signal; and
further amplifying the resultant upconverted signal corresponding to the unwanted frequency components by a current amplifier and providing the resultant current signal back to the passive input switch to cancel the unwanted frequency components of the radio frequency signal.

7. The method of claim 1, wherein the radio frequency tracking filter is a part of an integrated circuit of a transceiver circuitry.

8. An apparatus, comprising:
a passive input switch, comprising multiple switches, configured to receive a radio frequency signal from a signal path and to generate multiple commutated signals of the radio frequency signal; and
a plurality of active feedback loops having at least one active feedback loop for every commutated signal, wherein each active feedback loop is configured to feed frequency selected current to a respective output of the passive input switch to cancel only unwanted frequency components of the commutated signal,
wherein the apparatus is configured to filter the radio frequency signal leaving a wanted frequency component of the radio frequency signal in an original signal path and removing the unwanted frequency components of the radio frequency signal from the original signal path;
wherein one frequency component of the one of the multiple commutated signals is a baseband signal generated by the passive input switch, and at least one of the active feedback loops comprises:
a buffer voltage amplifier having a high input impedance configured to amplify the baseband signal using;
a baseband filter with a passband corresponding only to the unwanted frequency components configured to filter the amplified baseband signal to pass only frequencies corresponding to the unwanted frequency components; and
a current amplifier configured to further amplify the filtered and amplified baseband signal corresponding to the unwanted frequency and to provide the resultant current signal back to the passive input switch to cancel the unwanted frequency components of the radio frequency signal.

9. The apparatus of claim 8, wherein said apparatus comprises a radio frequency tracking filter.

10. The apparatus of claim 8, wherein any commutated signals of the multiple commutated signals is processed by one or more of the active feedback loops.

11. The apparatus of claim 8, wherein at least one frequency component of the multiple commutated signals is located at the Nth order local oscillator harmonic frequency, where N is a finite integer of one or more.

12. The apparatus of claim 8, wherein one frequency component of the multiple commutated signals is a baseband signal of the radio frequency signal generated using a local oscillator frequency signal.

13. An apparatus, comprising:
a passive input switch, comprising multiple switches, configured to receive a radio frequency signal from a signal path and to generate multiple commutated signals of the radio frequency signal; and
a plurality of active feedback loops having at least one active feedback loop for every commutated signal, wherein each active feedback loop is configured to feed frequency selected current to a respective output of the passive input switch to cancel only unwanted frequency components of the commutated signal,
wherein the apparatus is configured to filter the radio frequency signal leaving a wanted frequency component of the radio frequency signal in an original signal path and removing the unwanted frequency components of the radio frequency signal from the original signal path,
wherein one frequency component of the one of the multiple commutated signals is a harmonic signal generated by the passive input switch, and the filtering comprises:
a buffer voltage amplifier having a high input impedance configured to amplify the baseband signal using;
a mixer, configured to downconvert the amplified harmonic signal by a corresponding harmonic of a local oscillator frequency signal;
a baseband filter with a passband corresponding only to the unwanted frequency components configured to filter the downconverted and amplified baseband signal to pass only frequencies corresponding to the unwanted frequency components;
a further mixer configured to upconvert the resultant filtered signal by a corresponding harmonic of a local oscillator frequency signal; and
a current amplifier configured to further amplify the resultant upconverted signal corresponding to the unwanted frequency components by a current amplifier and to provide the resultant current signal back to the passive input switch to cancel the unwanted frequency components of the radio frequency signal.

14. The apparatus of claim 8, wherein the apparatus is a part of an integrated circuit of a transceiver circuitry.

15. The apparatus of claim 8, wherein the apparatus is a part of a wireless communication device.

16. An apparatus, comprising:
a passive input switch, comprising multiple switches, configured to receive a radio frequency signal from a signal path and to generate multiple commutated signals of the radio frequency signal; and
a plurality of active feedback loops having at least one active feedback loop for every commutated signal, wherein each active feedback loop is configured to feed frequency selected current to a respective output of the passive input switch to cancel only unwanted frequency components of the commutated signal,
wherein the apparatus is configured to filter the radio frequency signal leaving a wanted frequency component of the radio frequency signal in an original signal path and removing the unwanted frequency components of the radio frequency signal from the original signal path,
wherein the each of the plurality of the active feedback loops comprises at least a buffer voltage amplifier having a high input impedance, a baseband filter with a passband only for the unwanted frequency components in the corresponding one of the commutated signals, and a current amplifier generating the drawn current fed back to the passive input switch.

17. The apparatus of claim 8, wherein the each of the plurality of the active feedback loops has a high impedance for the wanted frequency components comprised in a corresponding one of the one or more commutated signals, so that no current representing the wanted frequency components of the radio frequency signal is drawn in any of the active feedback loops.

18. An apparatus, comprising:
means for receiving by a radio frequency tracking filter a radio frequency signal from a signal path; and
means for filtering by the radio frequency tracking filter the radio frequency signal leaving a wanted frequency component of the radio frequency signal in an original signal path and removing unwanted frequency components of the radio frequency signal from the original signal path using
a passive input switch comprising multiple switches and generating multiple commutated signals of the radio frequency signal, and
a plurality of active feedback loops having at least one active feedback loop for every commutated signal, each active feedback loop feeding frequency selected current to a respective output of the passive input switch to cancel only the unwanted frequency components of the commutated signal,
wherein the each of the plurality of the active feedback loops comprises at least a buffer voltage amplifier having a high input impedance, a baseband filter with a passband only for the unwanted frequency components in the corresponding one of the commutated signals, and a current amplifier generating the drawn current fed back to the passive input switch.

* * * * *